(12) United States Patent
Bruder et al.

(10) Patent No.: US 7,993,721 B2
(45) Date of Patent: Aug. 9, 2011

(54) DISC-SHAPED HIGH-DENSITY RECORDING MEDIUMS

(75) Inventors: Friedrich-Karl Bruder, Krefeld (DE); Wilfried Haese, Odenthal (DE); Rafael Oser, Krefeld (DE); Jan Wiekard, Ordenthal-Erberich (DE); Wolfgang Fischer, Meerbusch (DE); Rainer Protte, Dormagen (DE); Joerg Wehrle, Remagen (DE); Karlheinz Hildenbrand, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 469 days.

(21) Appl. No.: 12/288,203

(22) Filed: Oct. 17, 2008

(65) Prior Publication Data

US 2009/0104395 A1 Apr. 23, 2009

(30) Foreign Application Priority Data

Oct. 19, 2007 (EP) .................................... 07020497

(51) Int. Cl.
 *B32B 3/02* (2006.01)

(52) U.S. Cl. ..................... 428/64.1; 428/64.4; 430/270.1
(58) Field of Classification Search .................. None
See application file for complete search history.

(56) References Cited

U.S. PATENT DOCUMENTS

| | | | |
|---|---|---|---|
| 3,782,961 A | 1/1974 | Takahashi et al. | |
| 4,225,695 A | 9/1980 | Schuster et al. | |
| 6,201,783 B1 * | 3/2001 | Arakawa et al. | 369/275.1 |
| 6,391,418 B1 | 5/2002 | Ueda et al. | |
| 6,764,734 B2 * | 7/2004 | Vierk et al. | 428/847.1 |
| 6,875,489 B2 | 4/2005 | Koya et al. | |
| 6,908,655 B2 | 6/2005 | Arakawa et al. | |
| 7,407,698 B2 * | 8/2008 | Murata et al. | 428/64.4 |
| 2002/0155247 A1 * | 10/2002 | Arakawa et al. | 428/65.3 |
| 2003/0026936 A1 | 2/2003 | Kido et al. | |
| 2004/0151868 A1 * | 8/2004 | Kim et al. | 428/65.1 |
| 2004/0265605 A1 | 12/2004 | Hermann et al. | |

FOREIGN PATENT DOCUMENTS

| | | |
|---|---|---|
| DE | 1644798 | 9/1970 |
| DE | 2115373 | 10/1971 |
| DE | 2737406 A1 | 2/1979 |
| EP | 0317262 A2 | 5/1989 |
| EP | 0532337 A2 | 3/1993 |

(Continued)

OTHER PUBLICATIONS

S. Subramanian, et al., "Experimental and analytical characterization of the mechanical performance of disks," Proceedings of SPIE, (2000), pp. 323-328, vol. 4090, XP-002468839.

(Continued)

*Primary Examiner* — Elizabeth Mulvaney
(74) *Attorney, Agent, or Firm* — Conolly Bove Lodge & Hutz LLP

(57) ABSTRACT

Optical recording mediums comprising a substrate and a recording layer and a light transmitting layer sequentially disposed on the substrate; wherein the substrate comprises one or more parts selected from the group consisting of injection molded parts, injection molded sandwich structures having a molded surface layer and a molded core layer or two injection molded parts which are UV-bonded, and combinations thereof; and wherein the substrate has a Young's modulus E of at least 2.15 GPa and a Q factor of lower than 160 measured at 25° C. at 2000 Hz in accordance to ASTM E 756-05.

15 Claims, 1 Drawing Sheet

Setup of the Laser-Doppler-Vibrometer Method

FOREIGN PATENT DOCUMENTS

| | | | |
|---|---|---|---|
| EP | 1158024 | A1 | 11/2001 |
| EP | 1518880 | A1 | 3/2005 |
| GB | 1159551 | | 7/1969 |
| JP | 60-026024 | | 2/1985 |
| JP | 61-292601 | | 12/1986 |
| JP | 62-019801 | | 1/1987 |
| JP | 62-019802 | | 1/1987 |
| JP | 7-114030 | A | 5/1995 |
| WO | WO-00/48172 | A2 | 8/2000 |
| WO | WO-01/48031 | A1 | 7/2001 |
| WO | WO-03/005354 | A1 | 1/2003 |

OTHER PUBLICATIONS

Zijp, F., et al., "Near field read-out of a 50GB first-surface disk with NA=1.9 and a proposal for a cover-layer incident, dual-layer near field system," Proc. of SPIE, 2004, vol. 5380, pp. 209-223.

Mansfield, S.M., et al., "High-numerical-aperture lens system for optical storage," Optics Letters, 1993, vol. 18, No. 4, pp. 305-307.

Tominaga, J., et al., "An approach for recording and readout beyond the diffraction limit with Sb thin film," Applied Physics Letters, 1998, vol. 73, No. 15, pp. 2078-2080.

Saito, K., et al., "Readout method for ROM signal and air gap control signal in a near field system," Technical Digest ISOM, 2001, pp. 244-245.

Ishimoto, T., et al., "Gap servo system for a biaxial device using an optical gap signal in a near field readout system," Technical Digest ISOM/ODS, 2002, pp. 287-289.

Lee, J.I., et al., "High data transfer rate cover-incident near-field recording system with a solid immersion lens," Technical Digest ODS, 2006, pp. 43-45.

Brückl, H., "Die überwindung der beugungsbegrenzung," Physik in unserer Zeit, 1997, vol. 28, No. 2, pp. 67-73.

\* cited by examiner

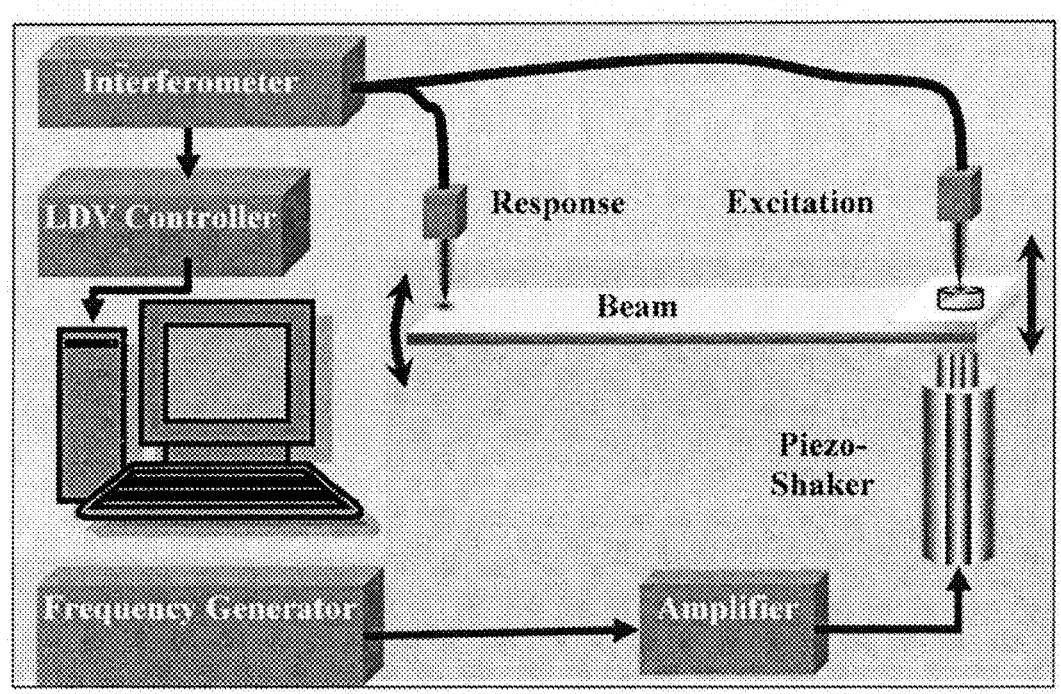
Figure 1: Setup of the Laser-Doppler-Vibrometer Method

100
DISC-SHAPED HIGH-DENSITY RECORDING MEDIUMS

BACKGROUND OF THE INVENTION

Known recording mediums for recording and reproducing information signals, such as that for audio or video, include disc-shaped optical recording mediums and disc-shaped magnetic recording mediums.

Among these recording mediums, there are optical discs, on which information signals are written as micro-irregularities, such as by pits and grooves, a phase-change optical disc, a magneto-optical disc, exploiting photomagnetic effects of the recording film, and a hard disc for magnetically written signals.

For forming a recording layer on an optical recording medium, among these recording mediums, having micro-irregularities, such as phase pits or pre-grooves, in association with information signals, such as data information or tracking servo signals, injection molding of a substrate of plastics material is routinely employed. Specifically, a disc-shaped substrate is formed using an injection molding device, a metal mold and a stamper, and information signals are transcribed at this time from the stamper.

To readout and record information to such optical discs usually a laser beam with wavelength $\lambda$ is focused through a simple objective lens of given numerical aperture NA onto the recording layer through a light transmitting layer of thickness $d \gg \lambda$ and at a working distance $WD \gg \lambda$ between the objective lens and the surface of the light transmitting layer. The spot diameter D of the focused laser beam is given hereby as $D=\lambda/NA$. Commercially available discs like Compact Discs (CD, $\lambda$=780 nm, NA=0.45, d=1.2 mm), Digital Versatile Discs (DVD, $\lambda$=650 nm, NA=0.60, d=0.6 mm), High Definition Digital Versatile Discs (HD-DVD, $\lambda$=405 nm, NA=0.65, d=0.6 mm) or Blu-ray Discs (BD, $\lambda$=405 nm, NA=0.85, d=0.1 mm) are using this Far Field Optic principle. By reducing $\lambda$ and increasing NA the spot diameter D can be reduced and therefore the data density can be increased.

However in such Far Field Optics (d and $WD \gg \lambda$) the NA of the objective lens is limited to values <1.0. To further increase the data density, the NA has to become larger than 1.0 which can be realized by Near Field Optics (NFR). One implementation of NFR can be by utilizing a so called Solid Immersion Lens (SIL) (see, e.g., S. M. Mansfield, W. R. Studenmund, G. S. Kino, and K. Osato, "High-numerical-aperture lens system for an optical storage head," Opt. Lett. 18, 305 ff (1993), the entire contents of which are incorporated herein by reference). For example, in a lens system composed of a Far Field lens of NA<1.0 and a hemispherical lens made of a material with index of refraction $n_{SIL}$, the effective numerical aperture $NA_{eff}$ is given by $NA \cdot n_{SIL}$ which will exceed 1.0 if $n_{SIL}$ is large enough. Another implementation could be by a small aperture of diameter $D_{Ap} \ll \lambda$, which can be realized either by fiber optics with a very narrow end aperture (see, e.g., H. Brückl, Physik in unserer Zeit, 28, Jahrgang 1997 Nr. 2, p 67 if, the entire contents of which are incorporated herein by reference) or by an optically non linear responding thin masking layer (so called Super Resolution Enhanced Near Field Structure, see, e.g., J. Tominaga, et al., Applied Physics Letters, Vol 73 (15) 1998 pp. 2078-2080, the entire contents of which are incorporated herein by reference).

NFR utilizes the electromagnetic field at a $WD \ll \lambda$ between the surface of the lens system or aperture and the surface of the disk or the recording layer. For example, in K. Saito et al., Technical Digest ISOM 2001, p 244 ff, it was shown that at a working distance W<<405 nm, sufficient light of the evanescent wave of a SIL can be coupled into the disc, so that $NA_{eff}$ of that SIL can be increased above the Far Field limit of 1.0. Also it was shown that the accuracy of WD has to be controlled to a level of a few nm in order to get a stable reproducing signal. This can be understood as the intensity of the evanescent wave decays exponentially with the distance from the lens surface. To establish such a control mechanism an active feed back servo loop was proposed and introduced by T. Ishimoto et al., Technical Digest ISOM/ODS 2002, WC3, p 287 ff, the entire contents of which are incorporated herein by reference. This servo loop is able to compensate also fluctuations of WD coming from modal oscillations of the rotating disc (J. I. Lee et al., Technical Digest ODS 2006 MC4, p 43 ff, the entire contents of which are incorporated herein by reference). However due to band width limitations of the servo loop such compensation works only well at lower disk rotation speeds and for low frequency modal oscillations with modal frequencies <800 Hz. Therefore a limitation in data transfer rates exists due to the amplitudes of the high frequency modal oscillations of an e.g. 1.1 mm thick massive polycarbonate disc with 120 mm diameter. The substrate disclosed therein does not fulfill the requirements of the substrate of the present invention. In order to improve the gap servo control operation also at high disc rotation speed especially the high frequency modal oscillation behavior of the disc has to be improved.

The modal oscillation is characterized by its modal frequency $f_n$ which is related to the geometry of the disc and the ration of Young's modulus E and mass density $\rho$ according to $f_n$ proportional to $(E/\rho)^{0.5}$ (see also equation 1). The quality factor Q (see equation 2) is related to tan $\delta$ via Q=3/tan $\delta$. In that sense Q can be used as a measure of the damping like tan $\delta$. Low Q means high damping as tan $\delta$ is high. In general E and Q shows a distinct dependency on frequency f.

U.S. Pat. No. 6,908,655 B2, the entire contents of which are incorporated herein by reference, focuses on influencing the low frequency (first) modal oscillations, that occur on a typical 1.1 mm thick massive polycarbonate disc of 120 mm diameter around 140 Hz and is also related to a far field optical pick up head.

WO 00/48172, the entire contents of which are incorporated herein by reference, is focussed on the first modal frequency (<300 Hz) behaviour of a disc and it is said that the first modal frequency should be preferably located outside the rotation operating range of the disc. With respect to the behavior of the high frequency modal oscillations (>=2000 Hz) no solution is disclosed. Comparative example 3 which is presented in the experimental part of the present application, based on example 2 of WO 00/48172, shows that solutions that fulfill the low frequency requirements with respect to damping do not meet the high frequency requirements of the present invention.

WO 2003/005354A1, the entire contents of which are incorporated herein by reference, describes special copolycarbonates to achieve improved damping of the discs. This disclosure differs from the present invention with respect to either the chemical structure of the polymer or describes the low (first) modal frequency requirements with respect to damping but does not describe the high frequency requirements of the present invention.

Further solutions to achieve improved damping at low frequencies (1 Hz-16 Hz), which however are not sufficient for the high frequency modal oscillation requirements of the present invention were published in U.S. Pat. No. 6,391,418 B1, EP 1 158 024 A1 and US 2004/0265605 A1, the entire contents of each of which are incorporated herein by reference. U.S. Pat. No. 6,391,418 B1 describes a substrate for information recording media made of a polycarbonate composition comprising polycarbonate of a viscosity-average molecular weight of 10.000 to 40.000 and on biphenyl, a terphenyl compound or a mixture thereof. EP 1 158 024 A1 describes a vibration-damping thermoplastic resin composition comprising a) 50-90 wt. % of an amorphous thermoplastic resin having a loss tan δ of 0.01 to 0.04 and a deflection temperature under load of not lower than 120° C. and b) 50 to 10 wt. % of a methyl methacrylate resin wherein the article molded therefrom has certain physical properties. US 2004/0265605 A1 describes a vibration damping storage medium for data comprising a substrate, a physical portion of which comprises at least one polyimide and at least one data layer on the substrate. It is related to the first modal (low frequency) oscillation.

Another important feature for NFR is, the ability to couple light from the evanescent field through the WD<<$\lambda$ into the surface of the recording medium to fully utilize the $NA_{eff}$ of the SIL for reducing D to $\lambda/NA_{eff}$. For that the real part n of the index of refraction of the uppermost light transmitting layer of the recording medium has to be larger than $NA_{eff}$. Such a layer can be realized by a high refractive index layer (HRI coating) which according to the invention may form the uppermost layer of recording medium and allows the coupling of light in the evanescent field into the recording medium. The HRI coating may also be used as a spacer layer between two or more reproducing layers or recording layers. To increase the storage density at least by a factor of 2, in comparison to the best respective Far Field optic (NA<1.0) $NA_{eff}$ should be at least >1.41 and therefore the real part n of the index of refraction of the HRI layer should be at least >1.41. Prior art focused on Far Field optics did not have to account for that.

U.S. Pat. No. 6,875,489 B2 or EP 1,518,880 A, the entire contents of each of which are incorporated herein by reference 1 are focusing on light transmitting layers with thicknesses d>3 μm, as these embodiments are related to Far Field optical discs like BD. As with NFR the effective $NA_{eff}$ is larger than 1.0, it is crucial to restrict the light transmitting layer thickness d to smaller values (e.g. <=3 μm) as it is easier to compensate for e.g. aberrations (Zijp et al., Proc. of SPIE Vol. 5380, p 209 ff.

In addition to the above mentioned optical properties of the HRI layer and due to the very small WD of NFR Optical Pick Up Heads, such HRI layer also should act as protection layer for the information stored in the recording medium and for the Optical Pick Up Head in case of an accidental head crash. Therefor the HRI layer should have a high scratch resistance and a low surface roughness $R_a$, as WD is in the range of only a few 10 nm. Also the absorption or imaginary part k of the index of refraction of the HRI layer should be low, in order to enable high enough reflection from multiple stacked recording layers, separated by spacer layers that may be comprised of the HRI layer and to realize high readout stability. Again, prior art did not have to account for such a complex property profile of the disc structure.

BRIEF SUMMARY OF THE INVENTION

Various embodiments of the present invention provide an optical recording medium for a gap servo controlled NFR disc in which at least a recording layer and a light transmitting layer are sequentially formed on a substrate, and in which the light is illuminated from the light transmitting layer side for recording and/or reproducing information signals and said substrate fulfills specific requirements with respect to the Young's modulus and the damping (Q-factor) at the high frequency of 2000 Hz. Furthermore, various embodiments of the present invention provide an optical recording medium as described above having a light transmitting layer with specific requirements with respect to index of refraction, scratch resistance and surface roughness.

The present invention relates to disc-shaped high density recording mediums with a special structure for recording a variety of information signals, like digital data adapted to Near Field Optical Pick up Heads.

In gap servo controlled Near Field Recording and Near Field Readout the working distance WD between the lens and the disk surface has to be reduced far below the wavelength $\lambda$ of the laser light and has to be controlled within tight limits. Therefore severe requirements with regard the high frequency modal oscillation behavior of the disc and with regard to the thickness, the optical and mechanical properties of the light transmitting layer exist. The present invention shows a special selection of disc architectures, realized with suitable materials to solve the aforementioned problems.

One embodiment of the present invention includes an optical recording medium comprising a substrate and a recording layer and a light transmitting layer sequentially disposed on the substrate; wherein the substrate comprises one or more parts selected from the group consisting of injection molded parts, injection molded sandwich structures having a molded surface layer and a molded core layer or two injection molded parts which are UV-bonded, and combinations thereof; and wherein the substrate has a Young's modulus E of at least 2.15 GPa and a Q factor of lower than 160 measured at 25° C. at 2000 Hz in accordance to ASTM E 756-05.

BRIEF DESCRIPTION OF THE SEVERAL VIEWS OF THE DRAWING

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the drawings:

FIG. 1 is diagrammatic representation of a Laser-Doppler-Vibrometer (LDV) set-up analogous to that described in ASTM E 756-05 which can be employed to measure Young's modulus E and Q factor of substrates used in various embodiments of the present invention.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a resin" herein or in the appended claims can refer to a single resin or more than one resin. Additionally, all numerical values, unless otherwise specifically noted, are understood to be modified by the word "about."

Influencing the modal oscillations of a disc at high frequencies can include: increasing its Young's modulus E (stiffness), which shifts the modal oscillation to higher frequency, thereby reducing it's amplitude at a given damping; or decreasing its quality factor Q (increase it's damping) to decrease the oscillation amplitude. To overcome the previously described problems, the stiffness or the damping can be improved as a single parameter, or both.

Various embodiments of the present invention include optical recording mediums that comprise at least a recording layer and a light transmitting layer. The recording layer and the light transmitting layer are sequentially formed on a substrate and light is illuminated from the light transmitting layer side for recording and/or reproducing information signals. The substrate may be comprised of an injection molded part or have an injection molded sandwich structure with a molded surface layer (skin layer) and a molded core layer or may be comprised of two injection molded parts which are UV-bonded. The substrate has a Young's modulus E of at least 2.15 GPa and a Q factor of lower than 160 measured at 25° C. at 2000 Hz in accordance to ASTM E 756-05.

The thickness of the light transmitting layer is preferably from 1 nm to less than 3000 nm, more preferably from 200 nm to less than 2000 nm and especially from 500 nm to less than 1500 nm.

Substrate Material:

Examples of suitable substrate materials for forming the substrate include polymers, blends and compounds (filled thermoplastic resin compositions), as long as the substrate satisfies the requirements of the Youngs's modulus E and the Q factor. However, the polymer resins of the present invention for said substrate are not limited to the following examples.

In case the thermoplastic resin itself does not fulfill the requirements regarding the Youngs's modulus E and the Q factor in a massive injection molded part, a blended or filled composition of that thermoplastic resin or a combination of the thermoplastic resin substrate material in a sandwich structure or in a bonded structure can be used.

In addition to the requirements regarding Youngs's modulus E and the Q factor, the thermoplastic resin, blend or compound should have a low water absorption, a high heat resistance and should be processable to disks with the common methods like injection molding, injection compression molding and the like.

Such thermoplastic resins can include polycarbonate resins, acrylic resins, polystyrene resin and amorphous polycyclic olefins as well as hydrogenated polystyrene. The thermoplastic resin also can be a blend consisting of different thermoplastic resins as well as be a compound of thermoplastic resin(s) with fillers and/or additives.

Polycarbonate Resins:

The polycarbonate resins are generally obtained by solution polymerization or melt polymerization of an aromatic dihydroxy compound and a carbonate precursor. Any aromatic dihydroxy compound is acceptable if it satisfies the above conditions.

Preferred aromatic dihydroxy compounds include compounds of formula (1):

HO—Z—OH (1)

in which Z denotes a radical of the formula (1a)

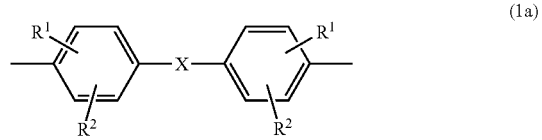

(1a)

in which $R^1$ and $R^2$ independently of each other represent H or $C_1$-$C_8$-alkyl, preferably H or $C_1$ $C_4$-alkyl, in particular hydrogen or methyl and X represents a single bond, $C_1$-$C_6$-alkylene, $C_2$-$C_5$-alkylidene or $C_5$-$C_6$-cycloalkylidene, which may be substituted by $C_1$-$C_6$-alkyl, preferably methyl or ethyl, with the proviso that $R^1$ and $R^2$ represent hydrogen if X represents 3,3,5 trimethylcyclohexylidene.

Most preferably X represents a single bond, methylene, isopropylidene or cyclo-hexylidene or 3,3,5 trimethylcyclohexylidene, in particular X represents isopropylidene or 3,3,5 trimethylcyclohexylidene.

Aromatic dihydroxy compounds are generally known or can be prepared according to generally known methods.

Examples of the aromatic dihydroxy compound include hydroquinone, resorcinol, 4,4'-biphenol, 1,1-bis(4-hydroxyphenyl)ethane, 2,2-bis(4-hydroxyphenyl)propane, 2,2-bis (4-hydroxyphenyl)butane, 1,1-bis(4-hydroxyphenyl)-1-phenylethane, 1,1-bis(4-hydroxyphenyl)cyclohexane, 2,2-bis(4-hydroxyphenyl)pentane, 4,4'-(p-phenylene diisopropylidene)diphenol, 9,9-bis(4-hydroxyphenyl)fluorene, 1,1-bis(4-hydroxyphenyl)-4-isopropyl cyclohexane, 2,2-bis(3-methyl-4-hydroxyphenyl)propane, 1,1-bis(4-hydroxyphenyl)cyclohexane, 1,1-bis(4-hydroxyphenyl)-3,3,5-trimethylcyclohexane, 9,9-bis(3-methyl-4-hydroxyphenyl) fluorene and α,α'-bis(4-hydroxyphenyl)m-diisopropylbenzene. Preferred dihydroxy compounds are 2,2-bis(4-hydroxyphenyl)propane (bisphenol A), 4,4'-(m-phenylene diisopropylidene)diphenol and 1,1-bis(4-hydroxyphenyl)-3,3,5-trimethylcyclohexane.

The polycarbonate resin may be a homopolycarbonate obtained by homopolymerizing the above aromatic dihydroxy compound or a copolycarbonate obtained by copolymerizing two or more aromatic dihydroxy compounds. Further, it may be a copolycarbonate obtained by polymerizing the above aromatic dihydroxy compound with one or more other dihydroxy compounds.

The reaction by a solution method is usually a reaction between a dihydric phenol and phosgene, and is usually carried out in the presence of an acid coupling agent and an organic solvent. As the acid coupling agent, alkali metal hydroxides, such as sodium hydroxide or potassium hydroxide, or amine compounds, such as pyridine, are used. As the organic solvent, halogenated hydrocarbons, such as methylene chloride or chlorobenzene, are used. For accelerating the reaction, a catalyst such as tertiary amines, quaternary ammonium compounds or quaternary phosphonium compounds which are exemplified by triethylamine, N-ethyl-piperidine, tetra-n-butylammonium bromide, or tetra-n-butylphosphonium bromide respectively may also be used. Preferably, the reaction temperature is routinely 0 to 40° C., with a reaction time being 10 minutes to 5 hours and with a pH during the reaction being not less than 9.

In the polymerization reaction, terminal capping agents are usually employed. These terminal capping agents used may be monofunctional phenols. These monofunctional phenols are routinely used as the terminal capping agents for adjusting the molecular weight. The polycarbonate resin obtained has its terminal capped by a monofunctional phenol based group so that it is superior in thermal stability to polycarbonate resin not obtained as described above. The monofunctional phenols are generally phenols or lower alkyl substituted phenols like phenol, p-tert-butylphenol, p-cumylphenol, isooctylphenol or long-chain alkyl phenols like decyl phenol, dodecyl phenol, hexadecyl phenol, octadecyl phenol, eicosyl phenol, docosyl phenol and triacontyl phenol.

The terminal capping agent is introduced in an amount to achieve the appropriate molecular weight. The terminal capping agent may be used alone or in combination.

The average molecular weight of the polycarbonate or the copolycarbonates is characterized by the relative solution viscosity of a polymer solution in dichloromethane with an Ubbelhode capillary viscosimeter, capillary type 0 C. The polymer concentration is 5 g/l, the measurement is done at a temperature of 25° C. The relative solution viscosity is in the range of 1.15 to 1.30, preferably in the range of 1.18 to 1.25, especially preferably in the range of 1.19 to 1.23.

The reaction by the melting method is usually an ester exchange reaction between a dihydric phenol and a carbonate ester, and can be carried out by a method including mixing the dihydric phenol and the carbonate ester in the presence of an inert gas, under heating and distilling off the generated alcohol or phenol. Although the reaction temperature differs with e.g., the boiling point of the generated alcohol or phenol, it is usually 120 to 350° C. During the latter half of the reaction, the reaction system is reduced in pressure to approximately $1.33 \times 10^3$ to 13.3 Pa to facilitate distillation of the generated alcohol or phenol. The reaction time is usually 1 to 4 hours.

Among the carbonate esters, there are esters, such as $C_6$ to C10 aryl groups or aralkyl groups or $C_{1-4}$ alkyl groups, that may occasionally be substituted, specifically, diphenyl carbonate, bis(chlorophenyl) carbonate, dinaphtyl carbonate, bis(diphenyl) carbonate, dimethyl carbonate, diethyl carbonate and dibutyl carbonate. Of these, diphenyl carbonate is most preferred.

For accelerating the polymerization, polymerization catalysts may also be used. As these polymerization catalysts, those catalysts routinely used for esterification or ester exchange reactions, such as alkali metal compounds, e.g., sodium hydroxide, potassium hydroxide, or sodium or potassium salts of dihydric phenols, alkali earth metal compounds, such as calcium hydroxide, barium hydroxide or magnesium hydroxide, nitrogen-containing basic compounds, such as tetramethyl ammonium hydroxide, tetraethyl ammonium hydroxide, trimethylamine or triethylamine, alkoxides of alkali metals or alkali earth metals, phosphorous-containing basic compounds like tetraphenylphosphoniumphenolat or organic acid salts of alkali metals or alkali earth metals, zinc compounds, boron compounds, aluminum compounds, silicon compounds, germanium compounds, organotin compounds, lead compounds, osmium compounds, antimony compounds, manganese compounds, titanium compounds or zirconium compounds, may be used. These catalysts may be used alone or in combination. These catalysts are used in an amount preferably of $1 \times 10^{-8}$ to $1 \times 10^{-3}$ equivalent, more preferably $1 \times 10^{-7}$ to $5 \times 10^{-4}$ equivalent, to one mol of the dihydric phenol as the starting material.

The aromatic polycarbonate resins may contain tri- or higher functional aromatic compounds or contain branched components in the polymer as a result of the isomerization reaction in polymerization. Examples of the tri- or higher functional aromatic compounds preferably include phlorogrucin, phlorogrucide, tris phenols, such as 4,6-dimethyl-2,4,6-tris(4-hydroxyphenyl)heptene-2,2,4,6-trimethyl-2,4,6-tris(4-hydroxyphenyl)heptane, 1,3,5-tris(4-hydroxyphenyl) benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methyl phenol, and 4-(4-[1,1-bis(4-hydroxyphenyl)ethyl]benzene)-α,α-dimethylnbenzyl phenol, tetra(4-hydroxyphenyl)methane, bis(2,4-dihydroxyphenyl)ketone, 1,4-bis(4,4-dihydroxytriphenyl methyl)benzene, trimellitic acid, pyromellitic acid, benzophenone tetracarboxylic acid and acid chlorites thereof. Of these, 1,1,1-tris (4-hydroxyphenyl)ethane and 1,1,1-tris(3,5-dimethyl-4-hydroxyphenyl)ethane, are preferred.

Phosphorus-based thermal stabilizers, may be added to the thermoplastic resin. Suitable phosphorus-based thermal stabilizers are for example, phosphorous acid, phosphoric acid, phosphonous acid, phosphonic acid and esters thereof. Specifically, phosphite compounds, such as triphenyl phosphite, tris nonylphenyl phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite and bis(2,4-di-tert-butylphenyl) pentaerythritol diphosphite, and phosphate compounds, such as tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxy ethyl phosphate, dibutyl phosphate and diisopropyl phosphate, may be indicated. Additional phosphorus-based thermal stabilizers are for example tetrakis(2,4-di-tert-butylphenyl)-4,4'-biphenylene diphosphonite, tetrakis(2,4-di-tert-butylphenyl)-3,3'-biphenylene diphosphonite and bis(2,4-di-tert-butylphenyl)-4-biphenylene phosphonite. Of these, tris nonylphenylphosphonite, distearyl pentaerythritol diphosphite, bis(2,4-di-tert-butylphenyl)pentaerythritol disphosphite, tris(2,4-di-tert-butylphenyl)phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite, are preferred. These thermal stabilizers may be used alone or as a mixture. The amount of these thermal stabilizers is preferably 0.0001 to 0.5 weight part, more preferably 0.0005 to 0.2 weight part and most preferably 0.002 to 0.2 weight part to 100 weight parts of the thermoplastic resin composition.

A generally known antioxidant may be added to the thermoplastic resin of the present invention to prevent oxidation. An example of the antioxidant is a phenol-based antioxidant. The amount of the antioxidant is preferably 0.0001 to 0.05 wt % based on the thermoplastic resin.

A higher fatty acid ester of a monohydric alcohol or polyhydric alcohol may be optionally added to the thermoplastic resin of the present invention. By blending a higher fatty acid ester of a monohydric or polyhydric alcohol, releasability from a mold at the time of molding the thermoplastic resin is improved, and a release load in the molding of a disk substrate becomes small, thereby making it possible to prevent the deformation of the disk substrate and pit dislocation caused by a release failure. The melt fluidity of the thermoplastic resin is also improved.

The amount of the ester of an alcohol and a higher fatty acid is 0.01 to 2 wt %, preferably 0.015 to 0.5 wt %, more preferably 0.02 to 0.2 wt % based on the thermoplastic resin.

Additives such as other thermoplastic resin, optical stabilizer, colorant, antistatic agent and lubricant may be added to the resin for an optical disk substrate of the present invention in limits that transcribility and the effect of reducing warp in the moisture absorption and moisture desorption steps of the molded disk are not impaired.

In the preparation of the resin composition of the present invention, it is conceivable that mixing of polycarbonate resins and/or mixing of a polycarbonate resin and other resin is carried out in the stage of a polymer solution or a molded article such as a particle or pellet. It is not particularly limited. As for means of mixing, in the stage of a polymer solution, a vessel equipped with a stirrer is mainly used, and in the stage of a molded product such as a particle or pellet, a tumbler, twin-cylinder mixer, Nauter mixer, Banbury mixer, kneading roll or extruder may be used. In either case, any technique may be used and not particularly limited.

In the above-mentioned resin composition, a variety of fillers can be added as additional component for improving stiffness and oscillation damping characteristics. The fillers may be enumerated by glass fibers, glass flakes, carbon fibers, milled fibers, wollastonite whiskers, carbon black, carbon nanotubes, silica particles, titanium oxide particles, alumina particles, talcum, mica and other inorganic materials. Also heat-resistant organic fillers, such as aramid fibers, polyarylate fibers, polybenzothiazole fibers and aramide powders can be used. In case such components are used, talcum fillers and graphitic fillers are preferred. The amount of addition of this component is preferably 1 to 30 wt % based on the weight of the resin composition.

The thermoplastic resin composition may be prepared by mixing respective components of the thermoplastic resin composition by a kneader, such as a tumbler, V-blender, Nauta mixer, Banbury mixer, kneader roll or an extruder. More preferably, the respective components are melted and kneaded together by an extruder, in particular a twin-screw extruder.

Acrylic Resin:

Suitable acrylic resins include polymethyl methacrylate or copolymers of methyl methacrylate and one or more other comonomers. Examples of such comonomers are acrylic acid alkylesters, such as methyl acrylate, ethyl acrylate, propyl acrylate, isopropyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate, methacrylic acid alkylesters, such as ethyl methacrylate, propyl methacrylate, isopropyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate, and copolymers thereof. Mixtures of the acrylic resins may also be used. Polymethyl methacrylate is the most preferred acrylic resin.

The molecular weight $M_W$ (weight average) of the acrylic resin is preferably 50,000 to 2,000,000 g/mol, more preferably of 60,000 to 1,000,000 gt/mol, most preferably 70,000 to 500,000 g/mol and especially 80,000 to 300,000 g/mol, measured by light scattering.

These acrylic resins may also be used in blends with above polycarbonates. The amount of the acrylic resin in this case is preferably less than 50 wt %. More preferably less than 20 wt %, especially preferred less than 10 wt % based on the total composition.

In blends with polycarbonate the acrylic resin may also be an acrylic resilient material. In this case it is composed of acrylate rubber components as essential components, methyl methacrylate, alkyl acrylates, with $C_1$ to $C_8$ alkyl groups, and vinyl monomers copolymerizable therewith, as necessary, as copolymer components. In such acrylic resilient material, the amount of methyl methacrylate is 15 to 65 wt % in 100 wt % of the resilient material.

The acrylate rubber contains $C_2$ to $C_{10}$ alkyl acrylate and, as components copolymerizable therewith, styrene, methyl methacrylate or butadiene, as necessary.

As $C_2$ to $C_{10}$ alkyl acrylate, 2-ethyl hexylacrylate and n-butylacrylate is preferred. This alkyl acrylate is preferably contained in an amount of 50 wt % in 100 wt % of the acrylate rubber. Also preferably, the acrylate rubber is cross-linked at least partially. The cross-linkage agents used for cross-linking may, for example, be enumerated by ethylene glycol diacrylate, butylene glycol diacrylate, ethylene glycol dimethacylate, allyl methacrylate and polypropylene glycol diacrylate. Preferably, 0.01 to 3 wt % of these cross-linking agents are used in the acrylate rubber.

As a preferred form of the acrylic resilient material, it may preferably be a core shell structure and a multi-layered structure obtained on polymerizing the acrylate rubber component, methyl methacrylate, alkyl acrylate with $C_1$ to $C_8$ alkyl groups, styrene and vinyl monomers copolymerizable therewith, in multiple layers, as necessary. This acrylic resilient material may be prepared by any known methods, such as block polymerization, suspension polymerization, block-suspension polymerization, solution polymerization or emulsion polymerization. The multi-layered structure may also contain a component not grafted on the graft base in multi-stage polymerization.

These resilient acrylic resins when used in blends with above polycarbonates preferably are used in less than 10 wt % of the total composition. More preferably their content is less than 5 wt %.

Polystyrene Resin:

Styrenic resins which are suitable in the various embodiments of the present invention include homopolymers of styrene, styrene co-polymers or styrenic thermoplastic elastomers or blends, for instance blends of polystyrene and polyphenylene-oxides. Those materials come in several forms, but for the most part include copolymers comprising Styrene, Isoprene, and Butadiene. The copolymers include triblocks such as S-B-S, S-I-S, S-EB-S, and S-EP-S; alternating block copolymers such as (S-I); branched block copolymers such as (S-B) and (S-I) and triblock/diblock blends (e.g. S-B-S/S-B).

These styrenic resins can be prepared according to the known rules of polymerization and by known procedures. The styrene polymers, for example, can be prepared by the method of Houben Weyl, Methods of Organic Chemistry, 4th Edition, Vol. XIV/1, pp. 761-841, Georg Thieme-Verlag (1961). They are also available on the market in suitable form. Free radical procedures are preferred, but ionic polymerization procedures can also be used. The molecular weights $M_W$ of the polymers used pursuant to the invention are usually above 2000, preferably in the range of 5000 to 5,000,000, and with special preference in the range of 20,000 to 200,000 Daltons. (Determined by light scattering; cf. Ullmann's Encyclopedia of Industrial Chemistry, 4th Edition, Vol. 15, pp. 285-387, Verlag Chemie 1978).

The homopolymers and copolymers may also be prepared by known procedures. (Cf. H. Rauch-Puntigam, Th. Volker, Acrylic and Methacrylic Compounds, Springer-Verlag 1967). Even though it is possible in principle to prepare them by anionic polymerization or group transfer polymerization (see also O. W. Webster et al., J. Am. Chem. Soc., 105, 5706 (1983)), nevertheless the preferred form of preparation is free radical polymerization.

The molecular weights $M_W$ (weight average) of the styrenic thermoplastic elastomers are in general higher than 2000, generally in the range of 10,000 to 2,000,000, preferably 20,000 to 200,000 Daltons, measured by light scattering.

Furthermore, polymers from the group of the amorphous polyolefines may also be used. Such polymers are resulting from polymerization of cyclic olefines, from ring opening polymerization of cyclic olefines as well as special hydrogenated polyolefines like hydrogenated polystyrene-based polymers.

Polycycloolefinic Resin.

Suitable polymers of cyclic olefins include, for example, polymerization products of olefins and a norbonene structure like norbornene itself, tetracyclododecene, vinylnorbornene or norbornadiene. Suitable polycycloolefinic resins also include copolymers of such olefins with a norbonene structure with olefins, for example, copolymers of ethylene and norbonene and ethylene and tetracyclododecene. Such products for instance are described in the Japanese Patent Application Kokai (Laid-Open) No. 292,601/86, Japanese Patent Application Kokai (Laid-Open) No. 26,024/85, Japanese Patent Application Kokai (Laid-Open) Nos. 19,801/87 and 19,802/87 as well as in EP-A 317 262 and EP-A 532 337, the entire contents of each of which are incorporated herein by reference.

Hydrogenated Polystyrene Resin:

Suitable hydrogenated polystyrene-based polymers may be of a linear or a star-like branched structure. Linear types are for instance described in JP-B 7-114030, polymers with star-like branched structure are described for instance in WO 0148031.

As substrate resins, also blends of above polymers can be used. Suitable additives like thermostabilizers, release agents and the like as well as fillers may also be added to the acrylic resins, polystyrene resins, polycycloolefine resins and hydrogenated polystyrene resins.

Bonder Material:

The bonder material is in general a UV-curable and spin coatable resin that may be comprised of a binder and a reactive thinner and additives like e.g. UV initiator or solvents. Typical photoinitiators (UV initiators) are α-hydroxy ketones (Irgacure 184®, Ciba), (Darocur 1173®, Ciba) or acylphosphines (Darocur TPO®, Ciba).

The binders can be chosen for example from the classes of Urethaneacrylates like e.g. Desmolux® XP 2513, Desmolux® U 100, Desmolux® U 200, Desmolux® XP 2614 or Desmolux® VP LS 2220, Bayer MaterialScience AG or amine modified polyetheracrylates like e.g. Desmolux® VP LS 2299, Bayer MaterialScience AG or elastic polyesteracrylates like e.g. Desmolux® LP WDJ 1602, Bayer MaterialScience AG.

Urethaneacrylates can be synthesized from alcohols and di- or polyisocyanates containing (meth)acrylolyl groups. Processes to synthesize urethaneacrylates are known and described e.g. in DE-A-1 644 798, DE-A 2 115 373 or DE-A-2 737 406. The alcohols, containing (meth)acrylolyl groups, can be esters of the acrylic acid or methacrylic acid with di-functional alcohols that contain one free hydroxyl group like e.g. 2-hydroxyethyl-, 2 or 3-hydroxypropyl or 2-, 3-, 4-, hydroxybutyl-(meth)acrylate and mixtures thereof. Also alcohols containing mono-functional (meth)-acrylolyl groups can be used or products that are composed mainly out of such alcohols that are obtained by esterification of n-functional alcohols with (meth)acrylic acid, whereby as alcohols also mixtures of different alcohols can be used, so that n is an integer or a mean (average) value larger than 2 to 4, preferable 3 and whereby per mol of the alcohols mentioned above most preferably (n−1) mol (meth)acrylic acid will be used.

Moreover products of those alcohols containing monofunctional (meth)acrylolyl groups with epsilon-caprolactone can be used. Preferred are the products from hydroxy alkyl (meth)acrylates with epsilon-caprolactone.

As di- or polyisocyanates in principle all (cyclo)aliphatic, aliphatic and aromatic structures are suitable, preferable (cyclo)aliphatic structures like e.g. hexa-methylene-di-isocyanate or isophorone di-isocyanate, tri-methyl hexa-methylene di-isocyanate, di-(isocyanato cyclo hexyl)methane or their derivatives with urethane-isocyanurate-, allophanate-, biuret-, uretdion-structures and mixtures thereof.

Suitable amine modified polyetheracrylates are known in principle and can be produced by esterification of methacrylic acid with three functional alcohols and mixtures of thereof and a subsequent reaction with primary amines. To these alcohols or the mixtures thereof belong e.g. low molecular weight products of alkoxylated o glycerol or trimethylolpropane e.g. the reaction product of ethyleneoxide and trimethylolpropane with an OH-number of 550 mg KOH/g. Per mol alcohol preferably 0.7 to 0.9 mol (methacrylic)acid is used. For the subsequent reaction with primary amines, mono-alkyl amines and hydroxy alkyl amines are suitable, e.g. hydroxyethylamine. The amounts of the used mono-alkyl amines are equivalent to a mol ratio of mono-alkyl amine and (meth) acrylic double bonds of 0.005:1 to 0.4 to 1 preferable 0.01:1 to 0.3 to 1.

Suitable polyesteracrylates are low viscous products that are synthesized according to the in principle known process of azeotropic esterification. Especially suitable are polyesteracrylates, that are comprised of alpha, beta-ethylenic unsaturated carbonic acids, alkoxylated polyethertriols, especially propoxylated trioles and acrylic acid, whereby a ratio of OH-groups to carboxyl groups from 1,2 to 1,6 is preferred.

The reactive thinners can be chosen from the classes of ethoxylated alkyl acrylates such as 2-(2-ethoxyethoxy)ethyl acrylate (Sartomer SR 256®, Sartomer), and mono-functional esters of t acrylic acid like ethoxylated phenyl acrylates such as ethoxylated (3) phenol monoacrylate (Photomer 4039 F®, Cognis), alkyl acrylates, e.g. lauryl- or stearyl acrylates, cycloaliphatic acrylic acid esters e.g. isobornyl acrylate and heterocyclic acrylic acid esters e.g. tetrahydrofurfuryl acrylate.

Light Transmitting Layer:

The light transmitting layer is in general a UV-curable and spin coateable resin having a real part of the index of refraction of at least 1.41 measured at 405 nm. The resin may be comprised of binder and reactive thinner molecules and further additives like e.g. a UV initiator or solvents. Typical photoinitiators (UV initiators) are α-hydroxy ketones such as 1-hydroxy-cyclohexyl-phenyl-ketone (Irgacure® 184, Ciba) or such as 2-hydroxy-2-methyl-1-phenyl-1-propanone (Darocur 1173®, Ciba), or monoacylphosphines such as 2,4, 6-trimethylbenzoyl-diphenyl-phosphineoxide (Darocur® TPO, Ciba). The binder molecules can be chosen for example from the classes of urethaneacrylates or polyetheracrylates. The reactive thinners can be chosen from the classes of ethoxylated alkyl acrylates, ethoxylated phenyl acrylates, cycloaliphatic acrylic acid esters and heterocyclic acrylic acid esters.

Light Transmitting Layer as a High Refraction Index Layer Coating A (HRI):

A high refractive index light transmitting layer (coating A) can be obtained from a casting solution A*, the casting solution A* being applied to a substrate (S) or to an information and recording layer (B) and crosslinked.

Component A* (Casting Solution)

The casting solution A* according to an embodiment of the invention includes the following components:

A1: a suspension containing nanoparticles and a mixture of water and at least one organic solvent,
A2: a binder and optionally
A3: further additives.

As used herein, nanoparticles are understood as being particles that have a mean particle size ($d_{50}$) of less than 100 nm, preferably from 0.5 to 50 nm, particularly preferably from 1 to 40 nm, very particularly preferably from 5 to 30 nm. Preferred nanoparticles additionally have a $d_{90}$ value of less than 200 nm, in particular less than 100 nm, particularly preferably less than 40 nm, very particularly preferably less than 30 nm. The nanoparticles are preferably in monodisperse form in the suspension. The mean particle size $d_{50}$ is the diameter above and below which in each case 50 wt. % of the particles lie. The $d_{90}$ value is the diameter below which 90 wt. % of the particles lie. Laser light scattering or, preferably, the use of analytical ultracentrifugation (AUC) are suitable for determining the particle size and demonstrating monodispersity. AUC is known to the person skilled in the art, as described, for example, in "Particle Characterization", Part. Part. Syst. Charact., 1995, 12, 148-157.

For the preparation of component A1 (a suspension containing nanoparticles and a mixture of water and at least one organic solvent), aqueous suspensions of nanoparticles of $Al_2O_3$, $ZrO_2$, $ZnO$, $Y_2O_3$, $SnO_2$, $SiO_2$, $CeO_2$, $Ta_2O_5$, $Si_3N_4$, $Nb_2O_5$, $NbO_2$, $HfO_2$ or $TiO_2$ are suitable, an aqueous suspension of $CeO_2$ nanoparticles being particularly suitable. Particularly preferably, the aqueous suspensions of the nanoparticles contain one or more acids, preferably carboxylic acids RC(O)OH wherein R=H, $C_1$- to $C_{18}$-alkyl, which may optionally be substituted by halogen, preferably by chlorine and/or bromine, or $C_5$- to $C_6$-cycloalkyl, $C_6$- to $C_{20}$-aryl or $C_7$- to $C_{12}$-aralkyl, each of which may optionally be substituted by $C_1$- to $C_4$-alkyl and/or by halogen, preferably chlorine, bromine. R is preferably methyl, ethyl, propyl or phenyl and particularly preferably is ethyl. The nanoparticle suspension may also contain as the acid mineral acid, such as, for example, nitric acid, hydrochloric acid or sulfuric acid. The aqueous suspensions of the nanoparticles preferably contain from 0.5 to 10 parts by weight, particularly preferably from 1 to 5 parts by weight, of acid, based on the sum of the parts by weight of acid and water. For example, the nanoparticle suspensions NanoCeria® $CeO_2$-ACT (an aqueous suspension of $CeO_2$ nanoparticles stabilised with acetic acid, pH value=3.0) and $CeO_2$-NIT (an aqueous suspension of $CeO_2$ nanoparticles stabilised with nitric acid, pH value=1.5) from Nyacol NanoTechn., Inc., USA are suitable.

Some of the water from these aqueous suspensions is replaced by at least one organic solvent. This partial solvent exchange is carried out by means of distillation or by means of membrane filtration, preferably by means of ultrafiltration, for example according to the "cross-flow" process. Cross-flow ultrafiltration is a form of ultrafiltration on an industrial scale (M. Mulder: Basic Principles of Membrane Technology, Kluwer Acad. Publ., 1996, 1st Edition), in which the solution to be filtered (feed solution) flows tangentially through the membrane. There is used for this solvent exchange preferably at least one solvent selected from the group consisting of alcohols, ketones, diketones, cyclic ethers, glycols, glycol ethers, glycol esters, N-methylpyrrolidone, dimethylformamide, dimethyl sulfoxide, dimethylacetamide and propylene carbonate. Preference is given to the use of a solvent mixture of at least two solvents from the above-mentioned group, a solvent mixture of 1-methoxy-2-propanol and diacetone alcohol particularly preferably being used. Particular preference is given to the use of a solvent mixture of 1-methoxy-2-propanol (MOP) and diacetone alcohol (DAA), preferably in a ratio of from 95:5 to 30:70, particularly preferably from 90:10 to 50:50. Water may be present in the solvent that is used, preferably in an amount of up to 20 wt. %, more preferably in an amount of from 5 to 15 wt. %.

In a further embodiment of the invention, the suspension of the nanoparticles can be prepared by solvent exchange in at least one of the above-mentioned organic solvents and then a further solvent is added, this further solvent being selected from the group consisting of alcohols, ketones, diketones, cyclic ethers, such as, for example, tetrahydrofuran or dioxane, glycols, glycol ethers, glycol esters, N-methylpyrrolidone, dimethylformamide, dimethyl sulfoxide, dimethyl-ac-etamide, solketal, propylene carbonate and alkyl acetate, for example butyl acetate. In this embodiment too, water may be present in the solvent used, preferably in an amount of up to 20 wt. %, more preferably in an amount of from 5 to 15 wt. %.

Preference is given to the use of ultrafiltration membranes made of polyether polysulfone, which preferably have a cut-off of less than 200,000 D, preferably less than 150,000 D, particularly preferably less than 100,000 D. The cut-off of a membrane is defined as follows: molecules of the corresponding size (for example 200,000 D and larger) are retained, while molecules and particles of smaller sizes are able to pass through ("Basic Principles of Membrane Technology", M. Mulder, Kluwer Academic Publishers, 1996, 1 st Edition). Such ultrafiltration membranes retain the nanoparticles even at high flow rates, while the solvent passes through. According to the invention, the solvent exchange takes place by continuous filtration, the water that passes through being replaced by the corresponding amount of solvent or solvent mixture. As an alternative to polymer membranes it is also possible to use ceramics membranes in the process step of solvent exchange.

The process according to such embodiments of the invention is characterized in that the replacement of water by one of the above-mentioned organic solvents or solvent mixtures does not fall below a limiting value of 5 wt. % in the resulting nanoparticle suspension (component A1). Preferably, the replacement of water by the organic solvent or solvent mixture is so carried out that the resulting nanoparticle suspension (component A1) has a water content of from 5 to 50 wt. %, preferably from 7 to 30 wt. %, particularly preferably from 10 to 20 wt. %. The resulting nanoparticle suspension preferably contains from 1 to 50 wt. %, more preferably from 5 to 40 wt. %, particularly preferably from 15 to 35 wt. % nanoparticles (referred to hereinbelow as the nanoparticle solids fraction).

If the solvent exchange of the nanoparticle suspension at the membrane cell is carried out for longer, so that a water content of less than 5 wt. % results, particle aggregation occurs, so that the resulting coating does not meet the conditions of monodispersity and high transparency. If, on the other hand, the water content in the organically based nanoparticle suspension is greater than 50 wt. %, the binders that are to be used in a subsequent step may no longer be dissolved in the water-containing suspension to give a clear solution, so that in both these cases, that is to say with agglomerated nanoparticles or with binders that have not dissolved to give a clear solution, the resulting coatings do not fulfill the simultaneous requirement for a high refractive index n and high transparency.

As binders (component A2) there may be used both non-reactive, thermally drying thermoplastics, for example polymethyl methacrylate (Elvacite®, Tennants) or polyvinyl acetate (Mowilith 30®, Synthomer), and reactive monomer components which, after coating, may be reacted by a chemical reaction or by means of a photochemical reaction to give highly crosslinked polymer matrices. For example, crosslinking is done by UV radiation. Crosslinking by means of UV radiation is particularly preferred in view of increased scratch resistance. The reactive components are preferably UV-crosslinkable acrylate systems, as are described, for example, in P.G. Garratt in "Strahlenhärtung" 1996, C. Vincentz Vlg., Hannover. The binder (component A2) is preferably selected from at least one of the group consisting of polyvinyl acetate, polymethyl methacrylate, polyurethane and acrylate. The binder (component A2) is particularly preferably selected from at least one of the group consisting of hexanediol diacrylate (HDDA), tripropylene glycol diacrylate, dipentaerythritol pentaacrylate, dipentaerythritol hexaacrylate (DPHA), ditrimethylolpropane tetraacrylate (DTMPTTA), tris-(2-hydroxyethyl)-isocyanurate triacrylate, pentaerythritol triacrylate, tris-(2-hydroxyethyl)-isocyanurate triacrylate and hexanediol diacrylate (HDDA).

The components used as further additives (component A3) in the casting solution are preferably at least one additive selected from the group of the photoinitiators and thermoinitiators. Based on the sum of the parts by weight of the components of the casting solution, up to 3 parts by weight of additives (component A3) are used, preferably from 0.05 to 1 part by weight, particularly preferably from 0.1 to 0.5 part by weight. Typical photoinitiators (UV initiators) are α-hydroxy ketones (Irgacure® 184, Ciba) or monoacylphosphines (Darocure® TPO, Ciba). The amount of energy (energy of the UV radiation) required to initiate the UV polymerisation is in the range of approximately from 0.5 to 4 $J/cm^2$, particularly preferably in the range from 2.0 to 3.0 $J/cm^2$ of coated surface. Also suitable as further additives are so-called coating additives, as are supplied, for example, by Byk/Altana (46483 Wesel, Germany) under the names BYK, for example BYR 344®.

The casting solution A* for the high refractive index coatings according to this embodiment of the invention can be prepared by dissolving at least one binder (component A2) and optionally further additives (component A3) in an organic solvent or solvent mixture, which may contain water. The resulting solution (referred to hereinbelow as the binder solution) is mixed with component A1 and optionally filtered and degassed. In a preferred embodiment, component A1 contains the same organic solvent or solvent mixture as the binder solution.

A casting solution A* preferably has the following composition:
  from 12 to 30 parts by weight, preferably from 13 to 25 parts by weight, particularly preferably from 14 to 19 parts by weight, nanoparticle solids fraction,
  from 2 to 8 parts by weight, preferably from 2.5 to 5 parts by weight, binder,
  from 0 to 3 parts by weight, preferably from 0.05 to 1 part by weight, particularly preferably from 0.1 to 5 parts by weight, further additives (component A3),
  from 7 to 28 parts by weight, preferably from 15 to 27 parts by weight, particularly preferably from 20 to 26 parts by weight, water and
  from 32 to 79 parts by weight, preferably from 42 to 70 parts by weight, particularly preferably from 50 to 63 parts by weight, organic solvent,
  the sum of the parts by weight of the components being normalized to 100.

A casting solution A* generally has a solids content of from 10 to 50 wt. %, preferably from 14 to 28 wt. %. The solids content of the casting solution A* is the sum of components A2, A3 and the nanoparticle solids fraction. The ratio of binder (component A2) to nanoparticle solids fraction in the casting solution is preferably from 40:60 to 7:93, particularly preferably the ratio is from 26:74 to 12:88.

The layer thickness of the coating A can generally be from 1 nm to 3000 nm, preferably from 200 nm to 2000 nm, particularly preferably from 500 nm to 1500 nm. The layer thickness may be adjusted by the solids content of the casting solution, in particular in the case of the spin coating process. If high layer thicknesses of the coating are desired, a higher solid content of the casting solution is used; if thinner coatings are desired, a low solids content of the casting solution is used.

The properties of the coating A of the coated product were determined as follows: the real component n and the imaginary component k of the complex refractive index were measured at a wavelength of from 400 to 410 nm (i.e. in the wavelength range of blue laser). The surface roughness was measured as the $R_a$ value by means of AFM (atomic force microscopy). For determining the scratch resistance, a diamond needle with a tip radius of 50 μm was moved over the coating at a rate of advance of 1.5 cm/s and with an applied weight of 40 g, and the resulting scratch depth was measured. Details of the respective measuring methods are given in the section relating to the production and testing of the coated products.

Substrate S:

The substrate (S) comprises a disc shaped article that is fabricated from polymer resins described above and by processes described below. By applying sequentially at least one recording layer and one light transmitting layer to that substrate, the optical recording medium is formed.

Processes to Produce Substrates for Optical Recording Mediums:

To produce a substrate from the above resins for an optical recording medium, an injection molding machine (including an injection compression molding machine) equipped with a stamper having pits and grooves which satisfy specifications required for an optical recording medium and a surface accuracy can be used to form an optical disk substrate by injection molding. The thickness of the disk substrate can be 0.3 to 2.0 mm. This injection molding machine may be a generally used machine but preferably a machine made from a material whose cylinder and screws have low adhesion to resins, corrosion resistance and abrasion resistance in order to suppress the production of carbide and improve the reliability of a disk substrate. The environment of the molding step is preferably as clean as possible in view of the object of the present invention. It is also important that the material to be molded should be fully dried to remove water and that residence which might cause the decomposition of a molten resin should be avoided.

The resin for an optical disk substrate of the present invention preferably has sufficiently high flowability which is advantageous for transcribility during injection molding or injection compression molding.

An optical recording medium can be produced by forming at least a reflection film on at least one side of the substrate of the present invention. The material of the reflection film is elemental metal or composite metal. Al or Au is used alone, or an Al alloy containing Ti in an amount of 0.5 to 10 wt %, preferably 3.0 to 10 wt % or an Al alloy containing Cr in an amount of 0.5 to 10 wt % is preferably used. The reflection film can be formed by physical vapour deposition, ion beam sputtering, DC sputtering or RF sputtering. Only this metal thin film (reflection layer) is sufficient for a prerecorded optical recording medium of the present invention, but a recording layer (e.g. a phase change film and a dye in the case of rewriteable or recordable and a recordable optical recording medium, and a magnetic-optical recording film in the case of an magneto-optical optical recording medium) and a light transmitting layer can be formed besides the reflection layer to obtain a rewriteable or recordable optical recording medium of the present invention.

The phase change film recording material layer is made from chalcogen alone or a chalcogen compound. Specifically, Te, Se or chalcogenite-based material such as Ge—Sb—Te, Ge—Te, In—Sb—Te, In—Se—Te—Ag, In—Se, In—Se—Tl—Co, In—Sb—Se, $Bi_2Te_3$, BiSe, $Sb_2Se_3$ or $Sb_2Te_3$ may be used.

A vertically magnetized film having magneto-optic properties including Kerr effect or Faraday effect, such as an amorphous alloy thin film of Tb—Fe—Co is used as the magneto-optical recording film layer.

The light transmitting layer is formed on the recording layer. The light transmitting layer is made from material that transmits laser light and is described more specifically in the sections general description of the light transmitting layer and general description of the light transmitting layer as a high refraction index layer cating a (HRI).

The process to form the light transmitting layer is described more specifically in the sections process for the production of the light transmitting layer and process for the production of the light transmitting layer as a high refractive index layer. Further, the thickness of light transmitting layer is limited to 1 nm to 3000 nm, preferably to 200 nm to 2000 nm, particularly preferably to 500 nm to 1500 nm, in order to suppress spherical- and chromatic aberrations.

The basic constitution of the optical recording medium of the present invention has been described above. Dielectric layers might be added to the above constitution to control the optical properties and thermal properties of the optical recording medium. In this case, the light reflection layer, first dielectric layer, recording layer, second dielectric layer and a light transmitting layer, can be formed on the substrate in the mentioned order. In addition the optical recording medium of the present invention described above is not limited to only one layer stack on the substrate that is comprised of the different layers mentioned above. It could also have multiple layer stack each separated by a spacer layer made out of materials that can be used also for the light transmitting layer.

Single Component Injection Molding Process (1-K Molding):

In the following, a production of a standard 1-K molded substrate suitable for use in an optical recording medium according to an embodiment of the present invention is described, said method was used in the experimental part and is not limiting to the scope of the invention so long as the substrate satisfies the requirements of the Young's modulus E and the Q factor. A disk substrate having a diameter of 120 mm and a thickness of 1.2 mm is injection molded from each pellet using an Arburg Alldisc equipped with a mold AWM2313 and a DVD-ROM stamper. Alternatively an Arburg 370 U 700 30/30 2-K injection molding machine is used, equipped with a sandwich plate, a Philips CD-Mould and a DVD-ROM stamper. For that a modified runner is used for the mold to adapt it to the sandwich plate. For a 1-K molded substrate the machine is feed with pellets of the identical resin.

To form the respective optical recording medium, a reflection layer (100 nm Ag) is formed on the 1-K molded substrate by physical vapor deposition (Leybold A1100) or by DC sputtering (Reuter LP 800). On that reflection layer and a light transmitting layer of the HRI type is formed according to the process described above.

To form a test beam for measurement of Young's modulus E and quality factor Q according to ASTM E 756-05, the beam can be cut out of the respective substrate of the optical recording medium, or the substrate covered with the recording layer stack or the substrate covered with the recording layer stack and the light transmitting layer, or by direct 1-K injection molding of the test beam from the respective resin used for the substrate of the present invention.

Two Component Sandwich Injection Molding Process (2-K Molding):

In the following, a production of a standard 2-K sandwich molded substrate suitable for use in an optical recording medium according to an embodiment of the present invention is described, said method was used in the experimental part and is not limiting to the scope of the invention if the substrate satisfies the requirements of the Young's modulus E and the Q factor. A disk substrate having a diameter of 120 mm and a thickness of 1.2 mm is injection molded from each pellet using an Arburg 370 U 700 30/30 2-K injection molding machine, equipped with a sandwich plate, a Philips CD-Mould and a DVD-ROM stamper. For that a modified runner is used for the mold to adapt it to the sandwich plate. For a 2-K sandwich molded substrate the machine is feed with pellets of different resins that shall form the three layer sandwich substrate, with a core layer made of one resin and two skin layers mode of the other resin. The ratio of the core layer thickness and the skin layer thicknesses is mainly controlled by the relative amounts of the dosed materials. In the first shot the skin layer resin is injected into the cavity of the mould, in the second shot the core layer is injected into the cavitiy of the mould and in a third shot the sprue is sealed again with the skin layer material. To achieve a homogeneous core layer thickness it is preferred to select the resins and the processing temperatures in such a way that the skin is formed by the resin with the higher flowability.

To form the respective optical recording medium and to cut out the test beams for Young's modulus E and quality factor Q measurements, the same procedures as described in Single component injection molding process (1-K molding) are used, with the exception of direct 1-K injection molding of the test beam.

UV-Bonding Process (UV Bonding):

In the following a production of a standard UV-bonded substrate suitable for use in an optical recording medium according to an embodiment of the present invention is described, said method was used in the experimental part and is not limiting to the scope of the invention if the substrate satisfies the requirements of the Young's modulus E and the Q factor. Disks having a diameter of 120 mm and a thickness of 0.6 mm are injection molded from each pellet using Singulus E Mould DVD-R machines attached to a Singulus Streamline II DVD-R, equipped with ST-moulds from Axxicon moulds and a DVD+R or DVD-R stamper. The UV-bonded substrate is produced from the two 0.6 mm thick disks by using the downstream process of the above mentioned Singulus Streamline II DVD-R with deactivated dye dispense and deactivated metallization but activated UV-bonding. For that the UV-bonding material is feed into the Singulus Streamline II DVD-R bonder tanks. The UV bonder distribution on the spin stand and the UV cure is done by using the following settings to reach the indicated bonding layer thicknesses:

| | | |
|---|---|---|
| Bonding layer thickness: | ~90 μm | ~40 μm |
| Rotation Speed 1: | 1800 RPM | 4500 RPM |
| Rotation Speed 2: | 2600 RPM | 6500 RPM |
| Dosage of bonder: | 1.2 gr | 0.6 gr |
| Illumination time: | 1.5 sec | 0.9 sec |
| Base Power: | 1.8 kW | 1.8 kW |
| Maximum Power: | 4.0 kW | 4.0 kW |
| Tank temperature: | 34° C. | 34° C. |
| Needle temperature: | 34° C. | 34° C. |

Alternatively, the UV-bonded substrate can be produced from the two 0.6 mm thick disks by using a laboratory spin coater (Karl Suss CT62) on which one 0.6 mm disk is clamped, the UV bonding material is dispensed by a sringe in the inner circumference of the already clamped disk at low rotation speeds of 200 RPM. The second 0.6 mm disk is put on top of the first clamped disk and than the UV bonding material is spread out between the two disks by rotating the spin coater at 1500 RPM for 8 seconds.

To form the respective optical recording medium and to cut out the test beams for Young's modulus E and quality factor Q measurements, the same procedures as described in Single component injection molding process (1-K molding) are used, with the exception of direct 1-K injection molding of the test beam.

Processes for Producing Light Transmitting Layers:

The resin can be applied to the surface of the substrate or to the surface of the information and recording layer by spin coating. Subsequent crosslinking of the resin may be carried out on a UV exposure apparatus, for example: To this end, the coated substrate is placed on a conveyor belt, which is moved past the UV light source (Hg lamp, 80 W) at a speed of about 1 m/minute. This process may also be repeated in order to influence the radiation energy per $cm^2$. A radiation dosage of at least 1 $J/cm^2$, preferably from 2 to 10 $J/cm^2$, is preferred. The coated substrate may then be subjected to thermal post-treatment, preferably with hot air, for example for from 5 to 30 minutes at a temperature of 60° C. to 120° C.

Process for Producing Light Transmitting Layers as High Refractive Index Layers (HRI):

A coating (A) can be prepared as follows:

i) replacing some of the water contained in an aqueous nanoparticle suspension by at least one organic solvent, so that the resulting nanoparticle suspension (component A1) has a water content of from 5 to 50 wt. %, ii) adding of at least one binder (component A2) to the nanoparticle suspension (component A1) to give a casting solution (A*), iii) applying the casting solution (A*) to a substrate (S) or to an information and recording layer (B), and iv) crosslinking the casting solution (A*) by thermal or photochemical methods.

Preferably, after step iii) residual solvent is removed completely or partially from the substrate (S) covered with the casting solution (A*) and/or a thermal post treatment is applied to the coating obtained after step iv).

The casting solution A* is optionally treated with ultrasound for up to 5 minutes, preferably for from 10 to 60 seconds, and/or filtered through a filter, preferably with a 0.2 μm membrane (e.g. RC membrane, Sartorius). Ultrasonic treatment can be applied to destroy nanoparticle agglomerates if present.

The casting solution is applied to the surface of the substrate or to the surface of the information and recording layer. After removal of excess casting solution, preferably by spinning, a residue of the casting solution remains on the substrate, the thickness of which residue is dependent on the solids content of the casting solution and, in the case of spin coating, on the spin conditions. Some or all of the solvent contained in the casting solution may optionally be removed, preferably by thermal treatment. Subsequent crosslinking of the casting solution, or of the residue, is carried out by thermal methods (for example using hot air) or photochemical methods (for example UV light). Photochemical crosslinking may be carried out on a UV exposure apparatus, for example: To this end, the coated substrate is placed on a conveyor belt, which is moved past the UV light source (Hg lamp, 80 W) at a speed of about 1 m/minute. This process may also be repeated in order to influence the radiation energy per $cm^2$. A radiation dosage of at least 1 $J/cm^2$, preferably from 2 to 10 $J/cm^2$, is preferred. The coated substrate may then be subjected to thermal post-treatment, preferably with hot air, for example for from 5 to 30 minutes at a temperature of 60° C. to 120° C.

The invention accordingly further provides processes for the production of a light transmitting layer, comprising the following steps:

i) preparation of a monodisperse nanoparticle suspension in at least one organic solvent, starting from an aqueous nanoparticle suspension, the water present in the aqueous nanoparticle suspension being removed and at the same time being replaced by at least one organic solvent, so that the nanoparticle suspension has a water content of from 5 to 50 wt. %, ii) addition of at least one binder (component A2) and optionally further additives (component A3) to the nanoparticle suspension (component A1) to give a casting solution (A*), iii) application of the casting solution from ii) to a substrate or to an information and recording layer (B), iv) optional removal of some or all of the solvent contained in the casting solution, preferably by thermal treatment, to give a residue on the substrate, v) crosslinking of the casting solution, or of the residue, by thermal or photochemical methods, and vi) optional thermal treatment of the coating, preferably at from 60 to 120° C.

Description of the Testing Procedures:

1. Measurement of the Young's Modulus E and the Quality Factor Q

To determine the Young's modulus E and the damping related factor Q (quality factor) of the materials in the frequency range from about 10 Hz to 10 KHz, a set up that is analogous to what is described in ASTM E 756-05 (FIG. 1) is used. This measurement principle is based on the evaluation of the resonance frequencies $f_n$ of an oscillating beam of the material of interest. To excite the resonance frequencies the beam is clamped on one side to a Piezo-shaker, which is driven by an analog white noise signal with a range stretching from 1 mHz to 10 KHz. The beam response to that excitation e.g. the velocity versus frequency measured with a Laser-Doppler-Vibrometer (LDV) at the tip of the beam that is not clamped to the Piezo-shaker normalized to e.g. the velocity versus frequency of the excitation at the end of the beam that is clamped to the Piezo-shaker is recorded. Form this response curve E and Q are calculated as follows:

$$E = \frac{12\rho l^4 f_n^2}{H^2 C_n^2} \quad \text{Equation 1}$$

$$Q = \frac{2 f_n}{\Delta f_n} \quad \text{Equation 2}$$

with:
E=Young's modulus of beam material in Pa,
$f_n$=the resonance frequency for mode n in Hz,
$\Delta f_n$=full bandwidth (FWHM) at the half-power of mode n in Hz,
$C_n$=coefficient for mode n of a clamped-free (uniform) beam,
H=thickness of beam in oscillation direction in meter,
l=length of beam in meter,
n=mode number: 1, 2, 3,
Q=Quality factor of the beam material, dimensionless,
$\rho$=mass density of the beam in $kg/m^3$ For example, the beam can be cut out of a disc, that was fabricated according to the procedures described above or can be injection molded. This description shall not restrict the way how to fabricate the beam, at least the layer structure viewed in the direction of the beam thickness is the same. The width W of the beam is chosen to be 0.013 m and the length l is chosen, so that the resonance frequencies fit well to the measured frequency range of 10 Hz to 10 kHz. The values of E and Q at 2000 Hz are calculated via linear interpolation using the respective values extracted from equation 1 and equation 2 at the measured $f_n$ below 2000 Hz and the measured $f_{n+1}$ above 2000 Hz.

2. Pit Height Measurement with AFM

The pit height was measured via an Atomic Forve Microscope in tapping mode.

3. Surface Roughness with AFM

The surface roughness is given as $R_a$, measured via an Atomic Forve Microscope in Tapping Mode according to ASTM E-42.14 STM/AFM.

4. Mass Density

The mass density ρ was measured with the Mettler density kit Mettler AT 250 H66765 at room temperature using ethanol as the immersing liquid, on samples cut out of the disks. Or alternatively a rectangular piece of the disc of known width W, known height H and know length l was cut out of the disc. The mass m of the rectangular piece of the disc was determined by weighing with a balance (e.g. Mettler AT 250) and ρ was calculated via ρ=m/(l·H·g).

5. Measurement of the Bonder Thickness

The thicknesses $d_1$ and $d_2$ of the two half discs were measured with a Schenk Prometheus 140 offline scanner in the DVD substrate mode. The total thickness $d_t$ of the bonded disc was measured with a Schenk Prometheus 140 offline scanner in the CD substrate mode. The bonder thickness $d_B$ was calculated from these thicknesses via:

$$d_B = d_t - (d_1 + d_2) \qquad \text{Equation 3}$$

6. Measurement of the Core Layer Thickness $d_C$ and Skin Layer Thicknesses $d_{S1}$ and $d_{S2}$ The thicknesses $d_{S1}$ and $d_{S2}$ of the two skin layers and the thickness $d_C$ of the core layer were measured on microtomed slices of a cross section of the disc via a stereo microscope.

7. Tilt Measurement

Disk tilt was measured with a Schenk Prometheus 140 offline scanner.

8. Measurement of the Complex Index of Refraction n*=n+i k

The real component n of the complex index of refraction n* and the imaginary component k of the complex index of refraction (also referred to hereinbelow as the absorption constant k) of the coatings are obtained from their transmission and reflection spectra. To achieve these spectra, about 100-300 nm thick films of the coating were applied by spin coating from dilute solution to quartz glass carriers. The transmission and reflection spectrum of this layer structure are measured by means of a spectrometer from STEAG ETA-Optik, CD-Measurement System ETA-RT and then the layer thickness of the coating and the spectral dependency of n and k are fitted to the measured transmission and reflection spectra. The fitting is done using the internal software of the spectrometer which requires the spectral dependency of n and k of the quartz glass substrate, which was determined previously in a blank measurement. k is related to the decay constant α of the light intensity as follows:

$$k = \frac{\lambda \cdot \alpha}{4\pi} \qquad \text{Equation 4}$$

λ is the wavelength of the light.

9. Measurement of the Scratch Resistance

In order to determine the scratch resistance of the coating on a disc substrate, scratches are made in the radial direction of that coated substrate, from inside to outside, using a diamond needle with a tip radius of 50 μm, at a rate of advance of 1.5 cm/s and with an applied weight of 40 g. The scratch depth is measured using an Alpha Step 500 step profiler from Tencor. This scratch depth is taken as a measure of the scratch resistance. A small value of the scratch depth means a high scratch resistance of the corresponding coating.

10. Measurement of the Water Content of the Coating Solution

The water content of the coating solution is determined by the method of Karl Fischer.

11. Measurement of the Thickness of the Light Transmitting Layer

For the thickness range of 1 nm to 1500 nm the light transmitting layer is applied with the identical process as it is applied to the substrate of the optical recording medium of the present invention on a transparent BPA-polycarbonate CD-substrate, said substrate was molded with a blank stamper (no pits and grooves are present). The transmission and reflection spectrum of this layer structure is measured by means of a spectrometer from STEAG ETA-Optik, CD-Measurement System ETA-RT and then the layer thickness of the coating is fitted to the measured transmission and reflection spectra. The fitting is done using the internal software of the spectrometer which requires the spectral dependency of n and k of the polycarbonate substrate, which was determined previously in a blank measurement and the n and k of the light transmitting layer, which were determined according to the description in Measurement of the complex index of refraction n*=n+i k. For the thickness range of 1500 nm to 150000 nm the thickness of the light transmitting layer that was applied to the substrate of the optical recording medium is measured by means of the CD-Measurement System ETA-RT with the modul "ETA-DVR Measuring System for Blu-ray/Digital Video Recording (DVR) Disks". For that the real part n of the complex index of refraction of the light transmitting layer is required which was determined according to the description in Measurement of the complex index of refraction n*=n+i k.

The invention will now be described in further detail with reference to the following non-limiting examples.

EXAMPLES

A reflection layer (B) of 100 nm Ag, if applied is formed on the substrate (S) by DC sputtering (Reuter LP 800).

The light transmitting layer, if applied on top of the reflection layer on the substrate (S) was obtained from the following components and procedures:

Component A.0

Ceria $CeO_2$-ACT®:aqueous suspension of $CeO_2$:20 wt. % $CeO_2$ nanoparticles in 77 wt. % water and 3 wt. % acetic acid, pH value of the suspension: 3.0, particle size of the suspended $CeO_2$ nanoparticles: 10-20 nm, spec. weight: 1.22 g/ml, viscosity: 10 mPa·s, manufacturer: Nyacol Inc., Ashland, Mass., USA.

Component A.2-1

Binder: dipentaerythritol penta-/hexa-acrylate (DPHA, Aldrich).

Component A.2-2

Binder: hexanediol diacrylate (HDDA, Aldrich).

Component A.3

UV photoinitiator: Irgacure® 184 (1-hydroxy-cyclohexyl phenyl ketone), Ciba Specialty Chemicals Inc., Basel, Switzerland.

The following components were used as organic solvents in the examples:

1-methoxy-2-propanol (MOP), manufacturer: Aldrich diacetone alcohol (DAA), manufacturer: Aldrich.

The aqueous $CeO_2$ nanoparticle suspension (component A.0) was converted into a nanoparticle suspension containing water and MOP (component A.1) by means of cross-flow ultrafiltration as described below:

A membrane module from PALL (Centramate OS070C12) with a UF membrane cassette (PES, MW 100,000) was used for the cross-flow ultrafiltration (UF). Permeation took place at a pressure of 2.5 bar, the water-containing permeate being discarded and the decreasing retentate being replaced by the alcoholic solvent 1-methoxy-2-propanol (MOP). 6.5 litres of component A.0 were used. As is shown in the table below, the filtration was ended after three cycles of different lengths, and there were thus obtained nanoparticle suspensions in a mixture of the organic solvent MOP and water (component A.1).

TABLE 1

Composition and properties of component A.1

| Component | Permeation time [h:min] | Amount of permeate [liters] | Water content of the retentate[1] [wt. %] | Solids content [wt. %] |
|---|---|---|---|---|
| A.1 | 15:45 | 13.2 | 12.3 | 30.4 |

[1]determined by means of Karl Fischer titration
2) contains 3 wt. % acetic acid The casting solution (component A*) having a water content 0f 10 wt. % was obtained by mixing solution A and solution B:

Solution A: 25 g of component A.2-1 and 6.2 g of component A.2-2 were dissolved, with stirring, in 108 g of the solvent DAA. 2.35 g of component A.3 were then added, whereupon a clear solution forms.

Solution B: In a glass beaker, 54 g of the solvent DAA were added to 435 g of component A.1 and the mixture was stirred, whereupon a transparent, yellow-coloured suspension was obtained, which was treated with ultrasound for 30 seconds. During that 32.5 g of water was added.

Solutions A and B were combined, then treated again with ultrasound for 30 seconds and filtered over a 0.2 μm filter (Minisart RC membrane). The calculated composition of the casting solution (component A*) is as follows:

TABLE 2

Composition and properties of casting solution component A*

| | Constituents in wt. % |
|---|---|
| Component A.2-1 DPHA | 3.77 |
| Component A.2-2 HDDA | 0.94 |
| Component A.3 | 0.35 |
| $CeO_2$[1] | 19.94 |
| MOP | 20.27 |
| DAA | 44.70 |
| Water | 10.02 |
| Solids content [wt. %][2] | 25.0 |

[1]The nanoparticle solids fraction (here $CeO_2$) resulting from component A.1
[2]The indicated solids content of each casting solution is the sum of component A.2-1 + component A.2-2 + component A.3 + nanoparticle solids fraction ($CeO_2$).

The real part n of the complex refractive index was measured to be 1.84 at 405 nm and the imaginary part k of the complex refractive index was measured to be 0.004 at 405 nm.

To apply the coating solution (component A*) to the reflective layer (B) on the disc shaped substrate (S) component A* was spin coated by dosing of component A* from a sringe in the inner diameter of the clamped substrate at low rotation speed of 240 RPM over a period of 2.1 seconds, distribution of component A* over the total area of the disc at 750 RPM over a period of 3.5 seconds, conditioning of the distributed component A* at 10 RPM over a period of time of 40 seconds, removal of excess component A* by spinning at high rotation speeds of 3000 RPM for a period of 40 seconds. The coating was crosslinked with a Mercury lamp at 5.5 J/cm$^2$. The residual layer thickness of the light transmitting layer was 730 nm.

Comparative Example 1

According to the procedure described in Single component injection molding process (1-K molding), Production of a standard 1-K molded substrate of the optical recording medium of the present invention a 1.2 mm thick disc with 120 mm diameter was molded from Bisphenol A polycarbonate (BPA-PC, relative solution viscosity 1.202) Makrolon OD 2015® on an Arburg Alldisc injection molding machine, equipped with a mold AWM2313 and a DVD-ROM stamper. To form a test beam for measurement of Young's modulus E and quality factor Q according to ASTM E 756-05, a beam was cut out of the respective disc with length l=114 mm, thickness H=1.2 mm and width W=12.7 mm. The mass density was determined with the Mettler density kit Mettler AT 250 H66765 to be 1.190 g/cm$^3$. With that the Young's modulus E and the quality factor Q at 2000 Hz were determined as E=2.53 GPa and Q=167.

Comparative Example 2

According to the procedure described in Single component injection molding process (1-K molding), Production of a standard 1-K molded substrate of the optical recording medium of the present invention a 1.64 mm thick test beam with 13.1 mm width W and 81 mm length l was directly injection molded from Polystyrene (CAS-no. 298-07-7, molecular weight 140000 Dalton, Aldrich/Germany) on an Arburg 370 injection molding machine. The mass density was determined with the Mettler density kit Mettler AT 250 H66765 to be 1.014 g/cm$^3$. With that the Young's modulus E and the quality factor Q at 2000 Hz were determined as E=3.28 GPa and Q=175 according to ASTM E 756-05.

Comparative Example 3

According to the procedure described in Single component injection molding process (1-K molding), Production of a standard 1-K molded substrate of the optical recording medium of the present invention a 1.64 mm thick test beam with 13.1 mm width Wand 81 mm length 1 was directly injection molded from a compound (compound 4) of a polycarbonate made from bisphenol A having a solution viscosity of 1,202 and with 20 weight-% of carbon fibres (carbon fiber Tenax-U Type 234, Toho Tenax Europe GmbH Wuppertal Germany).on an Arburg 370 injection molding machine. The mass density was determined with the Mettler density kit Mettler AT 250 H66765 to be 1.206 g/cm$^3$. With that the Young's modulus E and the quality factor Q at 2000 Hz were determined as E=6.18 GPa and Q=170 according to ASTM E 756-05.

Example 1

Substrate

A compound (compound 1) was made of 79.95 wt. % BPA-polycarbonate with a solution viscosity of 1.202 (Makrolon OD 2015®, Bayer MaterialScience), 5 wt. % polymethymethacrylate (PMMA 6N®, Degussa), 15 wt. % talcum (Finntalc MO5SL®, Mondo Minerals, Helsinki/Finland) and 0.05 wt. % glycerinmonostearate (Dimodan, Danisco/Germany) by compounding the respective components on a ZSK 25/4 extruder (Coperion Holding GmbH, Stuttgart/Germany) and pelletizing the melt strands after cooling in a water bath. These pellets were molded in 1-K injection molding process to a disc of 120 mm diameter and 1.2 mm thickness as described above in Single component injection molding process (1-K molding) using an Arburg 370 U 700 30/30 2-K injection molding machine, equipped with a sandwich plate, a Philips CD-Mould and a DVD-ROM stamper. From that disc substrate test beams were prepared as described in Single component injection molding process (1-K molding). The measured Young's modulus E and quality factor Q is depicted in table 3.

Example 2

Optical Recording Medium

A reflection layer and a light transmitting layer as described above were applied to the disc substrate of example 1. The scratch depth was determined to be 0.638 μm and the surface roughness was measured to be $R_a$=9.99 nm. From that disc substrate test beams were prepared as described in Single component injection molding process (1-K molding). The measured Young's modulus E and quality factor Q is depicted in table 3.

Example 3

Substrate

A compound (compound 2) was made of 59.90 wt. % BPA-polycarbonate (Makrolon OD 2015®, Bayer MaterialScience), 10 wt. % polymethymethacrylate (PMMA 6N®, Degussa), 30 wt. % talcum (Finntalc MO5SL®, Mondo Minerals, Helsinki/Finland), 0.05 wt. % bis(2-ethylhexyl)phosphate (CAS-no. 298-07-7, Alfa Aesar GmbH&Co KG, Karlsruhe/Germany) and 0.05 wt. % glycerinmonostearate (Dimodan, Danisco/Germany) by compounding the respective components on a ZSK 25/4 extruder (Coperion Holding GmbH, Stuttgart/Germany) and pelletizing the melt strands after cooling in a water bath. These pellets were molded in 1-K injection molding process to a disc of 120 mm diameter and 1.2 mm thickness as described above in Single component injection molding process (1-K molding) using an Arburg 370 U 700 30/30 2-K injection molding machine, equipped with a sandwich plate, a Philips CD-Mould and a DVD-ROM stamper. From that disc substrate test beams were prepared as described in Single component injection molding process (1-K molding). The measured Young's modulus E and quality factor Q is depicted in table 3.

Example 4

Optical Recording Medium

A reflection layer and a light transmitting layer as described above were applied to the disc substrate of example 3. The scratch depth was determined to be 0.706 μm and the surface roughness was measured to be $R_a$=8.06 nm. From that disc substrate test beams were prepared as described in Single component injection molding process (1-K molding). The measured Young's modulus E and quality factor Q is depicted in table 3.

Example 5

Substrate

A compound (compound 3) was made of 77.95 wt. % BPA-polycarbonate (Makrolon OD 2015®, Bayer MaterialScience), 10 wt. % polymethymethacrylate (PMMA 6N®, Degussa), 12 wt. % graphite Cond 5/99 (Graphit Kropfmühl AG, Hauzenberg/Germany) and 0.05 wt. % Glycerinmonostearate (Dimodan, Danisco/Germany) by compounding the respective components on a ZSK 25/4 extruder (Coperion Holding GmbH, Stuttgart/Germany) and pelletizing the melt strands after cooling in a water bath. These pellets were molded in 1-K injection molding process to a disc of 120 mm diameter and 1.2 mm thickness as described above in Single component injection molding process (1-K molding) using an Arburg 370 U 700 30/30 2-K injection molding machine, equipped with a sandwich plate, a Philips CD-Mould and a DVD-ROM stamper. From that disc substrate test beams were prepared as described in Single component injection molding process (1-K molding). The measured Young's modulus E and quality factor Q is depicted in table 3.

Example 6

Optical Recording Medium

A reflection layer and a light transmitting layer as described above were applied to the disc substrate of example 3. The scratch depth was determined to be 0.690 μm and the surface roughness was measured to be $R_a$=3.7 nm. From that disc substrate test beams were prepared as described in Single component injection molding process (1-K molding). The measured Young's modulus E and quality factor Q is depicted in table 3.

TABLE 3

1-K Molding

| | Resin/Compound | Density (g/cm³) | E at 2 kHz (GPa) | Q at 2 kHz |
|---|---|---|---|---|
| Example 1 | Compound 1 | 1.297 | 4.46 | 103 |
| Example 2 | Compound 1 | 1.298 | 4.56 | 107 |
| Example 3 | Compound 2 | 1.431 | 7.67 | 82.8 |
| Example 4 | Compound 2 | 1.427 | 7.46 | 93.1 |
| Example 5 | Compound 3 | 1.245 | 4.91 | 69.0 |
| Example 6 | Compound 3 | 1.259 | 5.10 | 77.2 |
| Comparative Example 1 | BPA-Polycarbonate | 1.190 | 2.53 | 167 |
| Comparative Example 2 | Polystyrene | 1.014 | 3.28 | 175 |
| Comparative Example 3 | Compound 4 | 1.206 | 6.18 | 170 |

Example 7

A 2-K sandwich injection molded disc of 120 mm diameter and 1.2 mm thickness was prepared as described above in Two component sandwich injection molding process (2-K molding) using an Arburg 370 U 700 30/30 2-K injection molding machine, equipped with a sandwich plate, a Philips CD-Mould and a DVD-ROM stamper from the pellets of compound 2 described in example 3 as core resin and pellets of BPA-polycarbonate (Makrolon OD 2015®, Bayer MaterialScience) as skin resin. The machine settings were set to 50% dosage volume of the skin material in the first shot and 50% dosage volume of the core material in the second shot. In the third shot the sprue was sealed with the skin material. The average core layer thickness $d_C$ measured on that disc was 57% of the total thickness and the two average skin layer thicknesses $d_{S1}$ and $d_{S2}$ were 21.5% of the total thickness respectively. From that disc substrate test beams were prepared as described in Two component sandwich injection molding process (2-K molding). The measured Young's modulus E and quality factor Q is depicted in table 4.

Example 8

A reflection layer and a light transmitting layer as described above were applied to the disc substrate of example 7. The scratch depth was determined to be 0.665 μm and the surface roughness was measured to be $R_a$=7.91 nm. From that disc substrate test beams were prepared as described in Two component sandwich injection molding process (2-K molding). The measured Young's modulus E and quality factor Q is depicted in table 4.

TABLE 4

2-K Sandwich Molding

| | Skin | Core | Density (g/cm³) | E at 2 kHz (GPa) | Q at 2 kHz |
|---|---|---|---|---|---|
| Example 7 | BPA-Polycarbonate | Compound 2 | 1.328 | 3.44 | 122 |
| Example 8 | BPA-Polycarbonate | Compound 2 | 1.324 | 3.51 | 136 |

Example 9

A UV bonded disc of 120 mm diameter and 1.2 mm thickness was prepared as described above in UV-bonding process (UV bonding) from two 0.6 mm thick half discs molded from pellets of BPA-polycarbonate (Makrolon OD 2015®, Bayer MaterialScience), using the above described setup of the Singulus Streamline II DVD-R. The UV bonder was composed of a mixture of 67.9 wt. % Desmolux XP 2513®, Bayer MaterialScience, 29.1 wt. % Sartomer SR 256®, Sartomer and 2.9 wt. % (Darocur 1173®, Ciba). The mixing of the components was done using a SpeedMixer™ according to the state of the art that is known to a person skilled in that art. The UV bonder distribution on the spin stand and the UV cure is done by using the settings to reach ~90 μm bonding layer thicknesses as described above too. The average bonder layer thickness $d_B$ measured on that disc 89 μm. From that disc substrate test beams were prepared as described in UV-bonding process (UV bonding). The measured Young's modulus E and quality factor Q is depicted in table 5.

Example 10

A reflection layer and a light transmitting layer as described above were applied to the disc substrate of example 9. The scratch depth was determined to be 0.523 μm and the surface roughness was measured to be $R_a$=3.6 nm. From that disc substrate test beams were prepared as described in UV-bonding process (UV bonding). The measured Young's modulus E and quality factor Q is depicted in table 5.

TABLE 5

UV Bonding

| | Substrate | Bonder | Density (g/cm³) | E at 2 kHz (GPa) | Q at 2 kHz |
|---|---|---|---|---|---|
| Example 9 | BPA-Polycarbonate | Bonder 1 | 1.187 | 2.19 | 14.0 |
| Example 10 | BPA-Polycarbonate | Bonder 1 | 1.186 | 2.33 | 15.3 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical recording medium comprising a substrate and a recording layer and a light transmitting layer sequentially disposed on the substrate; wherein the substrate comprises one or more parts selected from the group consisting of injection molded parts, injection molded sandwich structures having a molded surface layer and a molded core layer or two injection molded parts which are UV-bonded, and combinations thereof; and wherein the substrate has a Young's modulus E of at least 2.15 GPa and a Q factor of lower than 160 measured at 25° C. at 2000 Hz in accordance to ASTM E 756-05.

2. The optical recording medium according to claim 1, wherein the substrate has a Young's modulus E of at least 2.15 GPa and a Q factor of lower than 100 measured at 25° C. at 2000 Hz in accordance to ASTM E 756-05.

3. The optical recording medium according to claim 1, wherein the substrate has a Young's modulus E of at least 2.93 GPa and a Q factor of lower 160 measured at 25° C. at 2000 Hz in accordance to ASTM E 756-05.

4. The optical recording medium according to claim 1, wherein the light transmitting layer comprises a UV curable and spin-coatable resin having an index of refraction with a real part n of the index of refraction of at least 1.41.

5. The optical recording medium according to claim 1, wherein the light transmitting layer comprises a UV curable and spin-coatable resin having: (i) a complex refractive index with a real part n of the index of refraction of at least 1.70 and an imaginary part k of at most 0.016; (ii) a surface roughness $R_a$ of less than 20 nm; and (iii) a scratch resistance of not greater than 0.75 μm scratch depth; wherein the real part n and the imaginary part k of the complex refractive index are measured at a wavelength of 400 to 410 nm; wherein the surface roughness $R_a$ is determined by atomic force microscopy; and wherein the scratch depth is determined by moving a diamond needle having a tip radius of 50 μm over the light transmitting layer at a rate of advance of 1.5 cm/s under an applied weight of 40 g.

6. The optical recording medium according to claim 1, wherein the light transmitting layer comprises a UV curable and spin-coatable resin comprising nanoparticles having an average particle size ($d_{50}$) of less than 100 nm.

7. The optical recording medium according to claim 1, wherein the light transmitting layer has a thickness of 1 nm to less than 3000 nm.

8. The optical recording medium according to claim 1, wherein the light transmitting layer has a thickness of 200 nm to less than 2000 nm.

9. The optical recording medium according to claim 1, wherein the light transmitting layer has a thickness of 500 nm to less than 1500 nm.

10. The optical recording medium according to claim 1, wherein the substrate comprises a part prepared by a 1-K injection molding process.

11. The optical recording medium according to claim 1, wherein the substrate comprises a part prepared by a 2-K sandwich injection molding process.

12. The optical recording medium according to claim 1, wherein the substrate comprises two injection molded substrates bonded by a UV-bonding process.

13. The optical recording medium according to claim 1, wherein the substrate comprises a resin selected from the group consisting of polycarbonate resins, acrylic resins, polystyrene resins, polycycloolefinic resins, hydrogenated polystyrene resins, and combinations thereof.

14. The optical recording medium according to claim 1, wherein the substrate comprises a polycarbonate resin prepared with an aromatic dihydroxymonomer compound of the general formula (1):

$$HO-Z-OH \qquad (1)$$

wherein Z represents a radical of the general formula (1a):

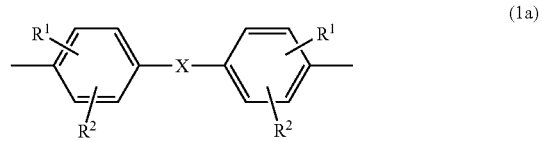

wherein each $R^1$ and $R^2$ independently represents an H or a $C_1$-$C_8$-alkyl; and X represents a single bond, a $C_1$-$C_6$-alkylene, a $C_2$-$C_5$-alkylidene or an optionally $C_1$-$C_6$-alkyl-substituted $C_5$-$C_6$-cycloalkylidene; with the proviso that when X represents 3,3,5 trimethylcyclohexylidene, $R^1$ and $R^2$ each represent hydrogen.

15. The optical recording medium according to claim 2, wherein the substrate comprises a resin selected from the group consisting of polycarbonate resins, acrylic resins, polystyrene resins, polycycloolefinic resins, hydrogenated polystyrene resins, and combinations thereof.

* * * * *